United States Patent [19]
Fluhr

[11] Patent Number: 5,979,846
[45] Date of Patent: Nov. 9, 1999

[54] HOLDER FOR A RIFLE AND KIT FOR ASSEMBLING HOLDER

[75] Inventor: Norbert Fluhr, Oberndorf, Germany

[73] Assignee: Heckler & Koch GmbH, Oberndorf/Neckar, Germany

[21] Appl. No.: 08/873,075

[22] Filed: Jun. 11, 1997

[30] Foreign Application Priority Data

Jun. 12, 1996 [DE] Germany ............................ 196 23 516

[51] Int. Cl.⁶ ................................ A47F 7/00; B60R 7/14
[52] U.S. Cl. ........................ 248/200; 248/316.5; 248/552; 224/546; 224/913; 211/64; 70/58; 70/62
[58] Field of Search .................................... 248/200, 201, 248/316.5, 551, 552, 553, 176.1, 310, 309.1; 224/913, 546; 211/64, 4; 70/58, 59, 60, 61, 62; 42/94

[56] References Cited

U.S. PATENT DOCUMENTS

| | | | |
|---|---|---|---|
| 1,837,939 | 12/1931 | Zimmerman | 224/42.33 |
| 2,158,623 | 5/1939 | Fischbacher | 312/6 |
| 2,316,995 | 4/1943 | Smith | 224/546 X |
| 2,536,252 | 1/1951 | Bates | 224/913 |
| 2,668,645 | 2/1954 | Pease | 224/546 |
| 2,919,058 | 12/1959 | Thompson | 224/546 |
| 2,958,422 | 11/1960 | Caloiero et al. | 211/64 X |
| 3,556,363 | 1/1971 | Whittaker | 224/546 |
| 3,802,612 | 4/1974 | Smith | 224/569 |
| 4,057,180 | 11/1977 | Whittaker | 224/282 |
| 4,364,499 | 12/1982 | McCue | 211/64 X |
| 4,986,427 | 1/1991 | Law et al. | 211/64 |
| 5,076,531 | 12/1991 | Delaney | 248/552 |
| 5,361,611 | 11/1994 | Hisler | 248/552 X |
| 5,524,772 | 6/1996 | Simmons | 224/546 X |

FOREIGN PATENT DOCUMENTS

| | | |
|---|---|---|
| 0 036 478 | 9/1981 | European Pat. Off. ........ F41C 29/00 |
| 498714 | 5/1930 | Germany . |
| 2263726 | 12/1972 | Germany . |
| 29 25 186 | 10/1984 | Germany . |
| 602159 | 5/1948 | United Kingdom ................ 248/316.5 |

OTHER PUBLICATIONS

Derwent Abstract corresponding to DE 29 25 186.

*Primary Examiner*—Ramon O. Ramirez
*Assistant Examiner*—Stephen S. Wentsler
*Attorney, Agent, or Firm*—Darby& Darby

[57] ABSTRACT

The invention provides a holder for a rifle for mounting the rifle on a wall, e.g. inside a vehicle, with one front and at least one rear retainer for securing a respective front and rear rifle section—as viewed in the direction of the barrel—, wherein the front retainer at least partially envelops the front gun-stock and/or the barrel of the rifle and wherein the rear retainer receives the rear section of the rifle. In addition, the invention provides a kit for assembling a rifle holder of this type.

12 Claims, 10 Drawing Sheets

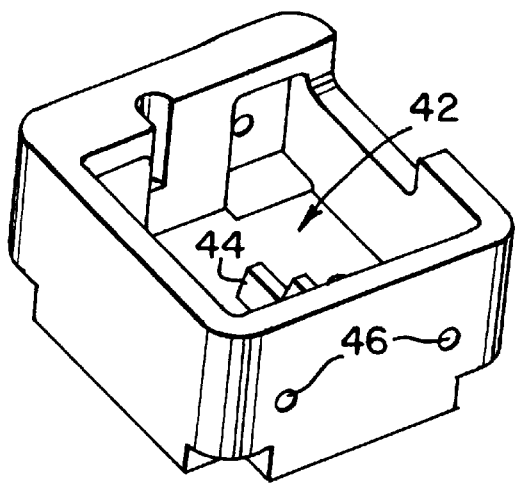
FIG. 3a
FIG. 3b
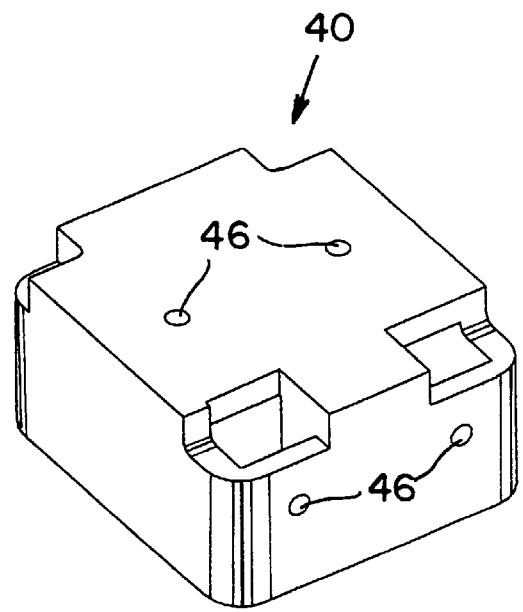
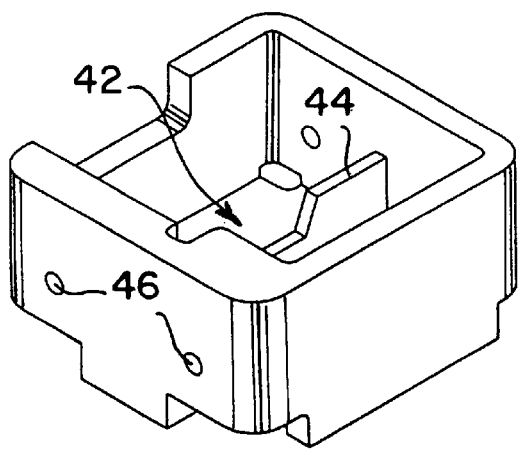
FIG. 3c

FIG. 4a   FIG. 4b   FIG. 4c
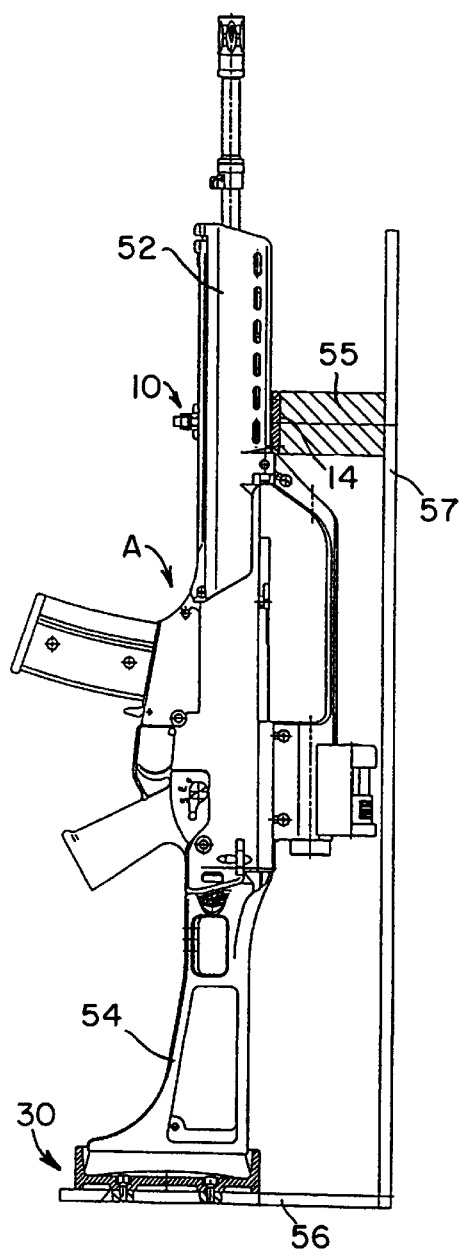
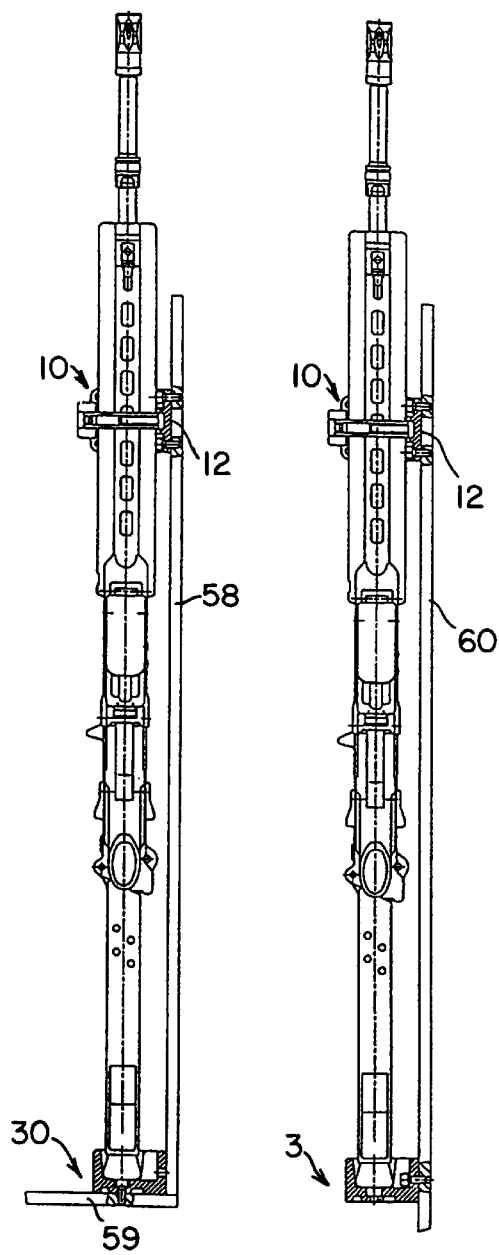

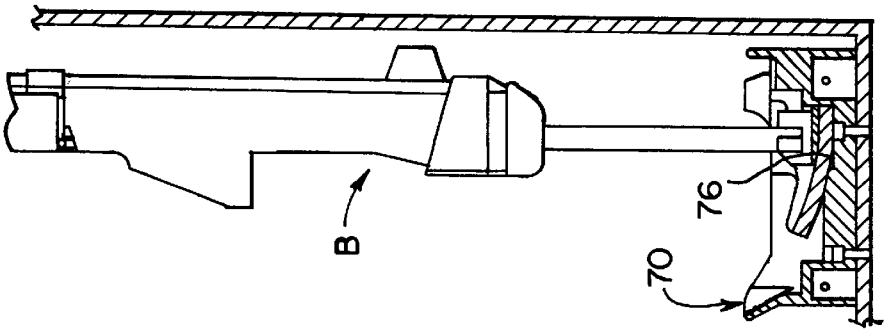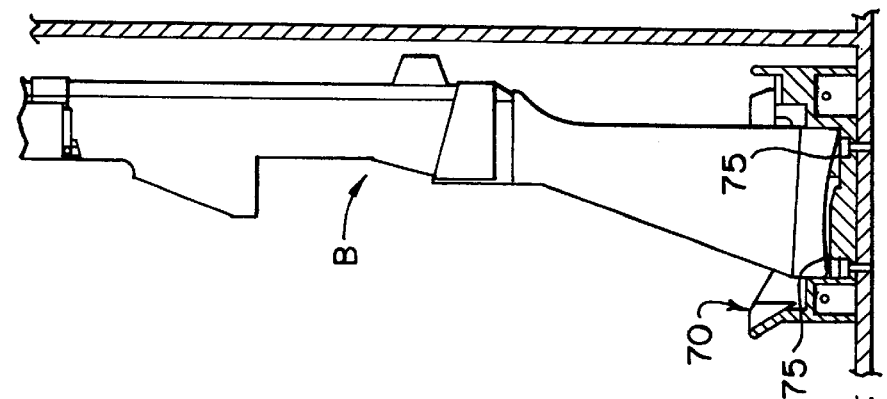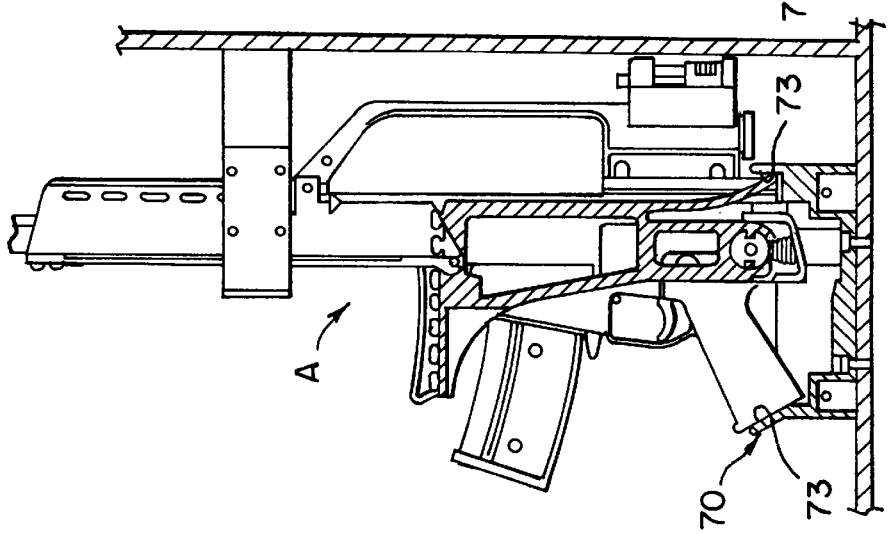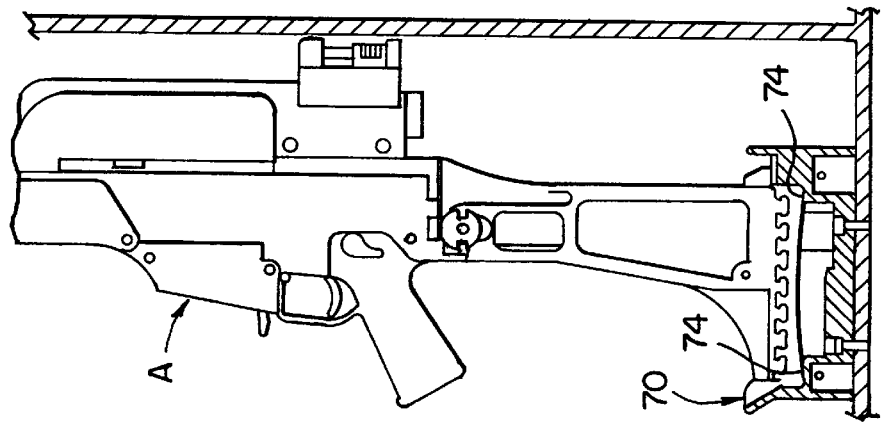

HOLDER FOR A RIFLE AND KIT FOR ASSEMBLING HOLDER

BACKGROUND OF THE INVENTION

1. Field of the Invention

The present invention relates to a holder for a rifle for mounting the rifle on a wall section, in particular inside a vehicle, with at least one front and at least one rear retainer for securing the rifle at a respective front and rear rifle section—as viewed in the direction of the barrel. The invention also relates to a kit for assembling such a holder.

Transportation of rifles especially in motor vehicles can cause a problem that the rifle(s) must, on one hand, be securely attached without taking up much space and must, on the other hand, be quickly removable from the holder when needed, for example inside military vehicles. Known rifle holders do not satisfy these requirements, mainly as a result of the strong vibrations which an automobile is subjected to in open terrain.

2. Description of the Related Art

From U.S. Pat. No. 1,837,939 there is known a rifle stand of the type described above which is mounted on the outside of a vehicle body. However, the known rifle stand is only capable of receiving the rifle in one specific position, namely vertically, and is furthermore only adapted for a certain type of rifle.

DE-PS 29 25 186 also describes a holder for a weapon which can be mounted inside an automobile, wherein the weapon holder has a front retainer for inserting the rifle barrel and a rear retainer enveloping the gun-stock at the transition to the rifle neck. With this design of a rifle holder, the rifle can advantageously be secured to a wall only in an essentially horizontal position, with the front gun-stock tilted slightly downwards. In any other orientation, the rifle would not be retained safely. If the rifle is secured, for example, in an upright position, then strong vibrations can cause the front gun-stock of the rifle to disengage from the front retainer, thereby causing the entire rifle to break away from the holder.

Moreover, DE-OS 22 63 726 describes a safety stand for rifles wherein several rifles can be stored like in an magazine, such as a weapons depot. Because of its size, this rifle stand, too, is not particularly suited for a flexible installation, especially not for mounting in a vehicle.

The common feature of these holders is that each type of holder and each type of rifle require a specific—specially adapted—holder.

SUMMARY OF THE INVENTION

It is the object of the present invention to provide a safe and adaptable holder for rifles, especially with respect to the mounting position and the rifle type.

Accordingly, the invention improves a holder of the type described above in that the front retainer at least partially envelops the front gun-stock and/or rifle barrel and the rear retainer receives the rear end of the rifle.

It is particularly advantageous that the two separate retainer of the rifle holder of the invention can be attached— in spaced relationship—in almost any position, for example, in or on a vehicle, such as upright on a vertical wall section, horizontally on a floor, hanging from a ceiling, etc., i.e. basically in any desired orientation on straight or inclined or angled walls or wall sections.

Furthermore, the rear end of the rifle which during, for example, vibrations is subjected to the largest forces as a result of its weight, is safely secured in the rear retainer, similar to a base or platform. Moreover, after the rifle is inserted into the rear retainer, the lighter-weight front section of the rifle can be inserted into or quickly and easily removed from the front retainer by a simple pivoting motion without applying a significant external force.

In a particularly preferred embodiment, the front retainer and/or rear retainer is (are) provided with several recesses and/or protrusions adapted to receive different types of rifles. Consequently, the same rifle holder can be used universally for receiving rifles with different shoulder supports and/or different barrels or gun-stocks.

In a preferred embodiment, the rear retainer is essentially shaped like a cup with stepped recesses adapted to receive different shoulder supports and extending along the inside of the cup-shaped retainer. Each stepped level therein represents one recess, with the shape of the recess matched at least in part to the respective rear rifle end so that the rear rifle end is received at least partially by the rear retainer in a formfitting manner. In this way, different types of rifles with different shoulder supports, such as rifles having insertable shoulder supports, are held securely in the same rear retainer.

Frequently, modern automatic rifles are also provided with a folding shoulder support which is connected to the other joint between rifle sections and which can be folded towards the rifle barrel, for example for storage in a magazine, and positioned to rest against the remaining rifle section. For receiving the rifle even under those conditions, the rear retainer of the holder of the invention is preferably provided with suitable extensions and protrusions, respectively, for receiving the folded shoulder supports. The rear retainer is therefore not only able to universally receive different shoulder supports in the recesses described above, but can also universally receive rifles of different types with a folded shoulder support.

Furthermore, the rear retainer of the invention can also be used independently, i.e. without the front retainer, for example as a base or support element for supporting a rifle which has to be assembled, repaired, cleaned or otherwise handled. Consequently, the invention also relates to such a stand-alone rear retainer.

In order to enable the front retainer of the holder of the invention to receive different types of rifles with a simple manual operation, the front retainer is provided with an inner profile with one or more releasably connectable adjusting elements corresponding to different rifle barrels or gun-stocks.

In another preferred embodiment of the holder of the invention, there is provided a separate rear retainer which is constructed in such a way that it surrounds the rifle end in a cup-like fashion when the shoulder support is folded. The rifle holder of the invention can then advantageously also be used for long-term storage of rifles in a weapons magazine.

Depending on the specific requirements for rigidity, the front and rear retainer are preferably made of different materials, most preferably of plastic, for example of glass-fiber-reinforced plastic. This provides the holder of the invention, on one hand, with excellent stability and makes it, on the other hand, light-weight and inexpensive to manufacture.

As noted above, known rifle holders are designed for mounting a rifle in a specific orientation. Each different orientation requires different holders, whereas the holder of the invention can be attached to a smooth wall section in almost any conceivable orientation. For this purpose, at least two side walls of the front retainer and three side walls of the rear retainer are preferably provided with one or more bores, so that the front retainer and the rear retainer can optionally be secured with screws to a smooth wall section in at least three different orientations.

Various types of locking devices can be used for locking the holder of the invention. A particularly advantageous locking mechanism is an eccentric lock with a locking element made of at least two pivotally connected locking members wherein the locking element is pivotally attached to one side of an opening adapted to receive the gun-stock and/or rifle barrel; and a recess on the opposite side of the opening for receiving one locking member of the locking element, whereby the one locking member can be locked by rotating the other locking member.

In another preferred modified embodiment, the front retainer includes a locking device with a single locking bar which is pivotally attached to one side of an opening, and a locking clasp located on the opposite side of the opening for engaging the locking bar when the retainer is closed. Preferably, at least the locking clasp is made of a flexible plastic, so that the locking device becomes a snap latch which can be opened and closed easily by a simple manipulation. The locking device can advantageously also be provided with a lock for safeguarding the rifle holder. If the rear rifle section is supported by the rear retainer when the rifle is inserted in the rifle holder of the invention, then—depending on the orientation—the gun-stock can be placed horizontally, tilted or upright in the upper retainer with only one hand and latched or, if desired, locked by activating the snap latch. Conversely, the rifle can be quickly removed from the upper retainer and subsequently from the lower retainer by lifting the clasp of the snap lock.

The clasp of the snap lock becomes even more flexible by having it extend unrestrained from the rear side of the retainer between two lateral sections across the entire height of the holder. The safety of the locking device can be improved further by providing on the front retainer a pin which in the closed position can be guided transversely to the locking bar from one lateral section through the locking clasp to the other lateral section. The pin can also be constructed in form of a locking bar with a cam which is then used to lock the rifle holder.

In another preferred embodiment, the inner surface of the locking bar is provided with a protrusion which its the closed position engages a respective recess on the front gun-stock of the rifle and/or is resiliently biased against the weapon. In this way, the rifle is not only safely secured laterally by the side walls of the front retainer, but also against movement along the direction of the barrel.

In addition, the invention provides a kit for assembling a holder for a rifle for mounting the rifle to a wall section, in particular inside a vehicle, including the following elements: a plurality of front retainer with different characteristic parameters which envelop the front rifle section, and a plurality of rear retainer with different characteristic parameters for receiving the rear rifle end, wherein the respective rear and front retainer are mounted to the wall section in the desired relative orientation with respect to each other.

The invention thereby provides a kit for a rifle holder adapted for universal installation. The individual front and rear retainer of the kit are distinguished from each other through their specific parameters, for example size, material, locking technique, etc., so that suitable retainer can be selected and mounted in the desired orientation depending on the particular mounting conditions encountered.

The component type "front retainer" includes, for example, retainers with different heights for holding the front rifle section at the desired spatial separation from the wall to which it is mounted. In a preferred embodiment of the kit, the front retaining member has a uniform height and can be secured to the wall with the desired separation by using stackable spacers with different lengths.

If in the rifle holder kit of the invention, n different components are provided for each type of component, then $n^2$ different holders can be realized. If the kit of the invention for assembling a holder is kept in inventory, then a holder can be created on moments notice which is specifically adapted for storing a rifle of a specific type in every conceivable position and orientation, e.g. on the floor, on inclined or angled walls, on the ceiling, etc.

Preferably, the component types of the rifle holder kit are constructed in the same fashion as the aforedescribed front and rear retainer of the holder of the invention. Consequently, the flexibility of the kit of the invention is enhanced even further by the advantages provided by the individual component types described above.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views:

FIGS. 3a–3c are three perspective views of a second preferred embodiment of a rear retainer of the rifle holder according to the invention;

FIGS. 4a–4c are side and bottom views of a rifle placed in a holder for illustrating different mounting positions;

FIGS. 8a–8d side views of rifles of type A placed in the rear retainer of FIG. 7 with extended and folded shoulder support as well of type B with fixed and insertable shoulder support;

DETAILED DESCRIPTION OF THE PRESENTLY PREFERRED EMBODIMENTS

In the perspective views, the same retainer are depicted as they appear when viewed from different directions, e.g. from the rear, from the front and from the side, as shown in FIGS.

1a–1c. In addition, the holder of the invention is described in relation to securing automatic rifles. This should, however, not be interpreted as a limitation, since the holder of the invention can equally be used for other types of rifles, such as hunting rifles.

Figure 1A:
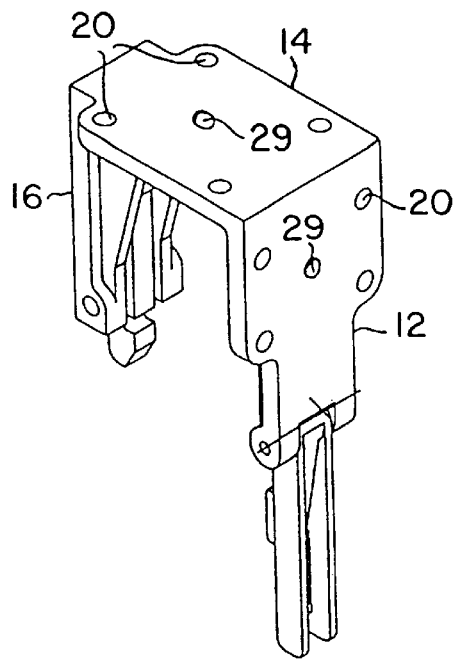
FIGS. 1a–1c are three perspective views of a first preferred embodiment of a front retainer of the rifle holder according to the invention.
Figure 1B:
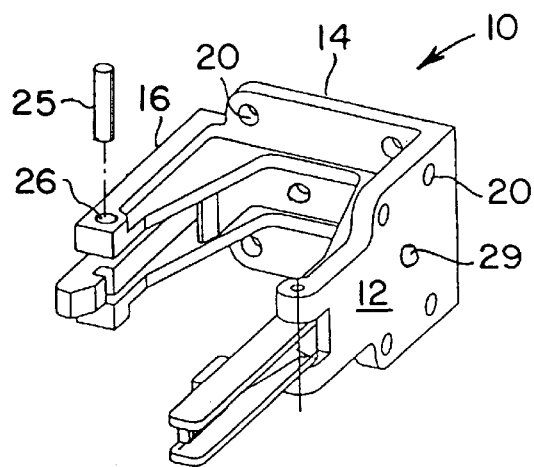
Figure 1C:
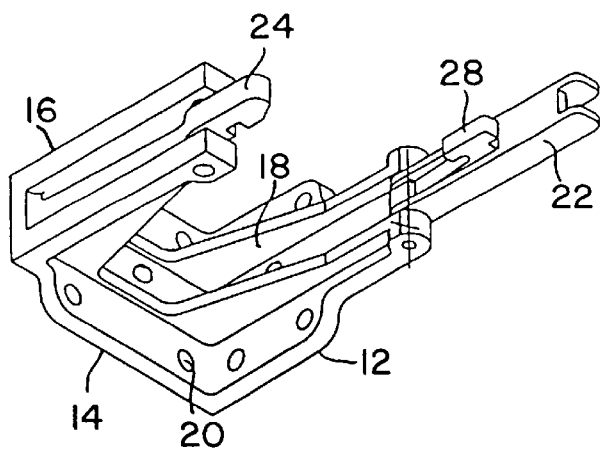

Referring now to FIGS. 1a–1c, there is shown in perspective view a preferred embodiment of a front retainer 10 which completely envelops and tightly clasps the front gun-stock of a rifle (see FIGS. 4 and 5). The holder has three side walls 12, 14, 16 oriented perpendicular to each other, with their inner surface provided with a protruding profile 18, the shape of which matches a section of the front gun-stock of the rifle. The side walls 12 and 14 are provided with bores 20 for accepting fastening means for mounting the holder 10 to a wall or a wall section, e.g. inside a motor vehicle. Optionally one or more of its side walls of the holder 10 can be mounted flush with the wall. If the center bore 29 in the side wall 14 is also used for installation and a rifle is inserted and secured with a padlock, then the holder cannot be removed, since the rifle blocks access to the center bore 29, thereby preventing a release of the respective fastening means.

The front of the holder 10 is provided with a locking mechanism comprising an elongated locking bar 22 which is pivotally attached to the tapered end of the side wall 12 and which in its closed position is held by a locking clasp 24 protruding from the front end of the side wall 16. The locking clasp 24 extends freely from the rear side 14 of the holder 10 between two lateral sections of the side wall 16. Moreover, the holder 10 is made of a light plastic material, so that the locking clasp 24 is flexible in the direction perpendicular to the side wall 16 and engages—in the closed position—the locking bar 22 like a snap lock. When the locking mechanism is opened, the locking clasp 24 is bent slightly backwards, thereby releasing the locking bar 22.

In the closed position, the locking device can be locked by a locking pin 25. Here, the pin 25 is guided through a bore 26 from a lateral section of the side wall 16 through the locking clasp 24 and through a bore 26 to another lateral section 24. In addition, the inside of the locking bar 22 is provided with a protrusion 28 which is resiliently connected via a rib to the locking bar 22 and which, when in the closed position, engages a respective recess in the front gun-stock of the rifle, thereby preventing the rifle from shifting, for example, as a result of potential vibrations. The protrusion 28 also acts as a spring for securing the weapon without play.

Figure 2B:
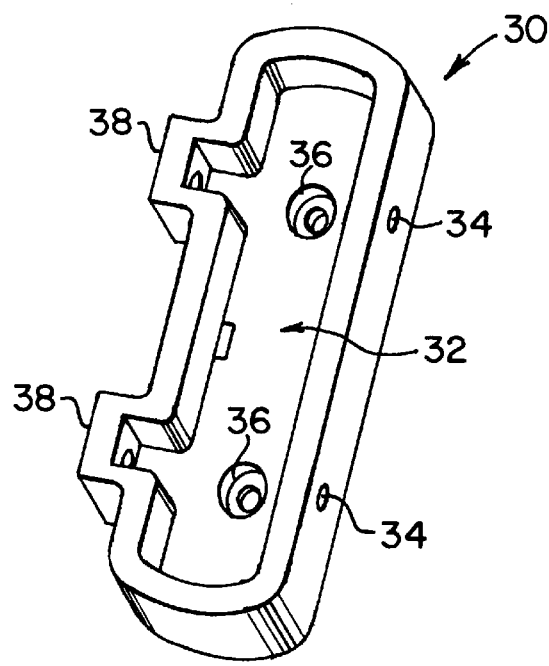
FIGS. 2a–2c are three perspective views of a first preferred embodiment of a rear retainer of the rifle holder according to the invention.
Figure 2C:
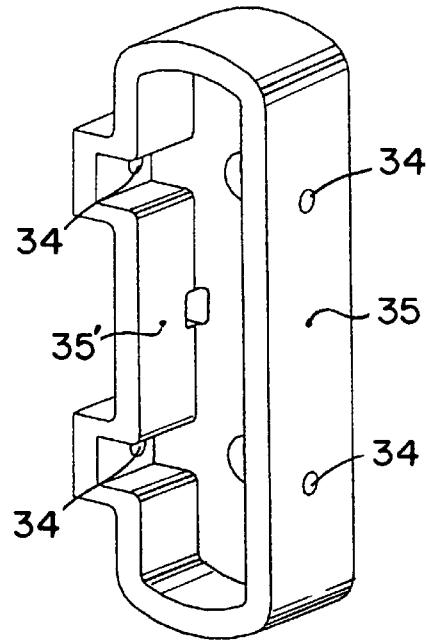
Figure 2A:
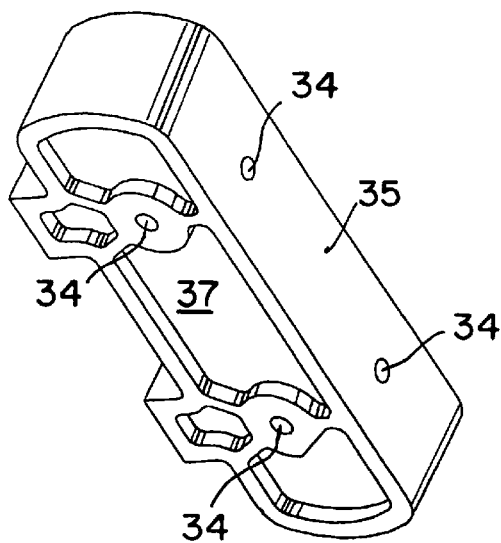

In FIGS. 2a–2c, there are depicted three perspective views of an modified embodiment of the rear retainer 30 of a rifle holder in accordance with the invention. The retainer 30 is made of plastic and includes a cup-shaped recess 32 adapted to receive the end section of a shoulder support or a rifle butt. The recess 32 is shaped in such a way that it substantially envelops the rear end of the shoulder support or the rifle butt in a formfitting manner. The retainer 30 is also provided with bores 34, in particular on the side walls 35, 35' and on the rear wall 37 of the retainer 30, for inserting fastening means for mounting the retainer 30, thereby allowing flexible attachment of the retainer 30 to one of the side walls 35, 35' or to the rear wall 37 in various orientations. Furthermore, the retainer 30 has counterbores 36 formed on the inside of the rear wall 37 and protrusions 38 formed on the side wall 35', so that any fastening means are displaced away from the receiving section of the recess 32 towards the mounting wall.

The two retainer 10 and 30 described in FIGS. 1 and 2 can be mounted with a certain spatial separation therebetween, for example, in a motor vehicle, in such a way that a rifle can be securely stored in an arbitrary position, such as vertically on a side wall, horizontally on the floor, on a sloped wall or even on a ceiling—with the front gun-stock enveloped by the front retainer and the rear end of the rifle supported by the rear retainer.

According to another aspect of the invention, the present invention provides a multi-purpose rifle holder kit with two types of components, namely, on one hand, the type "front retainer" and, on the other hand, the type "rear retainer". Each component type herein includes an arbitrary number of components with different specific parameters, e.g. with respect to size, form, material, locking mechanism, etc. According to the invention, the front and rear retainer described with reference to FIGS. 1 to 19 are all part of the component types discussed above.

For example, in FIGS. 3a–3c there is depicted another component of the rifle holder kit of the invention belonging to the component type "rear retainer". Shown here are three perspective views of a rear retainer 40 which is also cup-shaped and has a recess 42 for receiving a rear rifle end with a folded shoulder support. The shoulder support of modern automatic rifles is frequently attached to the remaining rifle section and can be folded if desired, and placed against the remaining rifle section. In this configuration, the rifle can be inserted in the rear retainer 40. A partition 44 within the recess 42 provides a stable support for the rear rifle section and ensures that the weapon oriented correctly. Like the retainer 30 in FIGS. 2a–2c, the retainer 40 also has respective bores 46 for mounting the retainer 40 in different positions, e.g. optionally with its back side or with one of the side walls on the floor, on a wall or on a wall section.

In the following FIGS. 4 and 5, there is shown a rifle of type A which is placed in the same rifle holder in three different mounting positions:

Depicted in the side view of FIG. 4a is a front gun-stock 52 of the rifle A enveloped by a front retainer 10 (shown here in cross-section) which corresponds to the retainer of FIGS. 1a–1c. In addition, a shoulder support 54 stands in a cup-like rear retainer 30 as described with reference to FIGS. 2a–2c. Here, the back side of the rear retainer 30 is mounted with two fastening means to a wall section 56, e.g. a floor. The backside 14 of the front retainer 10 (cf. FIGS. 1a–1c) is supported via a spacer 55 (cf. FIG. 6a and 6b) by a wall section 57 oriented perpendicular to the wall section 56. In this mounting position, the rifle A is standing vertically, separated by a certain distance from the wall 57.

The bottom view of FIG. 4b shows the rifle A located in the same retainer 10 and 30 which in this case, however, are mounted in a different position. The side wall 12 (cf. FIGS. 1a–1c) of the front retainer 10 is supported by a wall section 58. The backside of the rear retainer 30 is mounted to a wall section 59, such as a floor, with its side section resting against the wall 58. The wall segments 58 and 59 are oriented perpendicular to each other so that in this mounting position the rifle rests directly against the wall 58.

In FIG. 4c there is shown a bottom view of the rifle A which is again placed in the same retainer 10 and 30, but in another third mounting position. The two retainer 10 and 30 are here secured with their side of a single wall section 60. The rifle A rests directly against the wall 60, with the shoulder support 54 of the rifle supported by the rear retainer 30. The rifle A can be removed from and inserted into the front retainer 10 in the direction parallel to the wall 60. The wall section 60 can have any orientation, such as vertical, horizontal, inclined, and overhead.

Figure 5A:
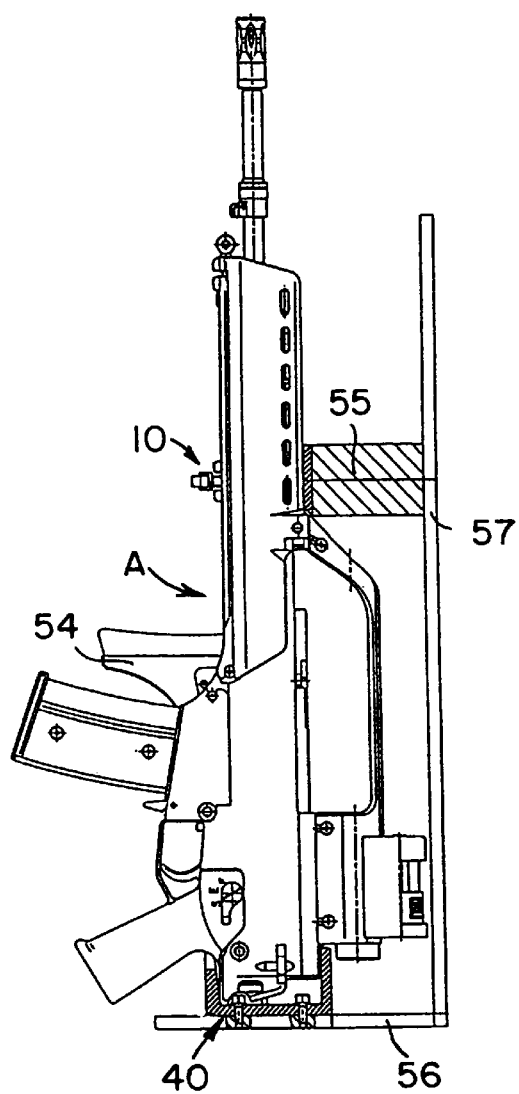
FIGS. 5a–5c are side and bottom views of a rifle with folded shoulder support in another holder.
Figure 5B:
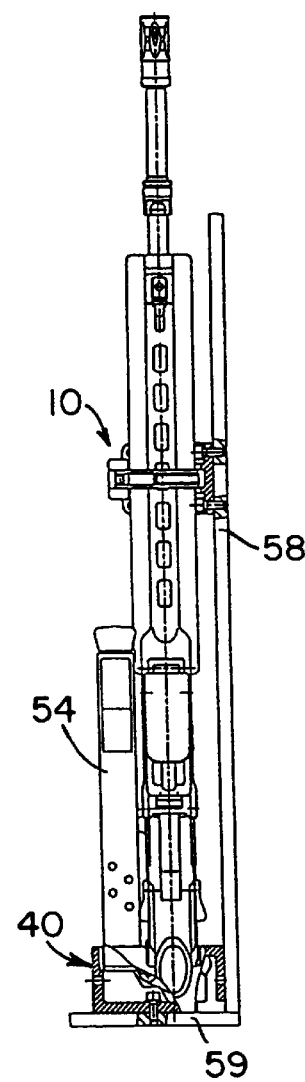
Figure 5C:
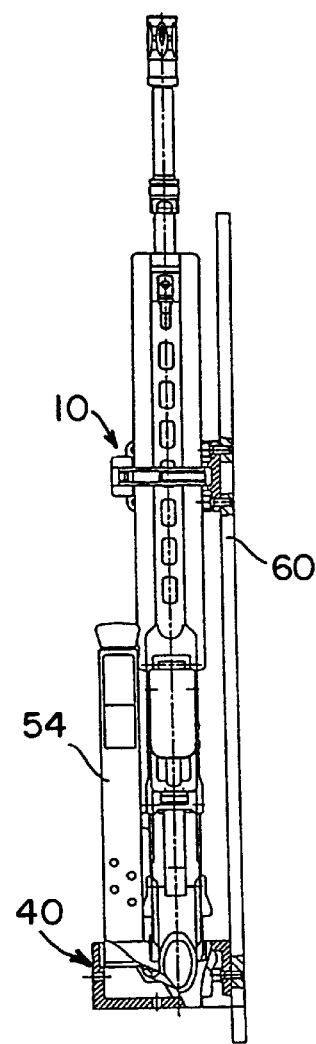

In FIGS. 5a, 5b and 5c, the rifle is shown with folded shoulder support 54. In this position, the rifle A is placed in a holder comprising a rear retainer 40 according to FIG. 4a–4c, and a front retainer 10 according to FIGS. 1a–1c. The installation of the retainer 10 and 40 on the wall segments 56, 57, 58, 59 and 60—and the mounting position of the rifle A resulting therefrom—corresponds to that of the retainer 10 and 30 in the FIGS. 4a, 4b and 4c.

The front retainer 10 in FIGS. 4a and 5a is secured to the wall 57 via a spacer 55. Depending on the rifle type, spacers 55 of different type, especially of different lengths are provided for securing the rifle A at the desired distance from the mounting wall 56 in the position shown in the FIGS. 4a and 5a.

Figure 6A:
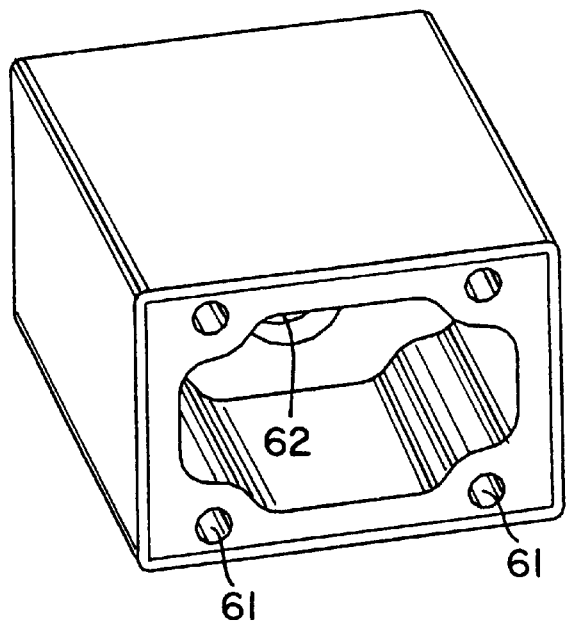
FIGS. 6a–6b are two perspective views of a spacer for mounting the holder of FIGS. 1a–1c.
Figure 6B:
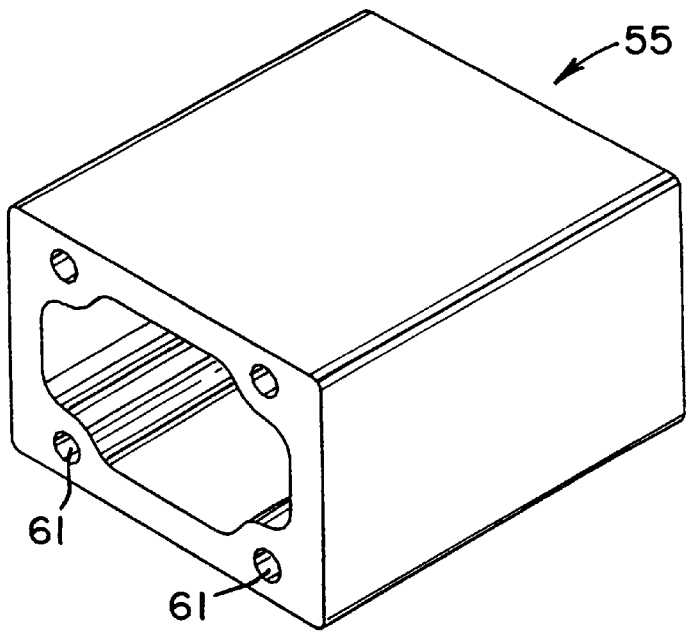

FIGS. 6a and 6b show an example for such a spacer 55 in perspective view. The spacer has essentially the form of a hollow cube with an open front and rear end, with the cross-section of the cube matching the backside 14 of the front retainer 10. The spacer 55 is preferably a molded part made of plastic. In the side walls, there extend in axial direction four through holes 61, which during the installation overlap with the bores 20 on the backside 14 of the front retainer 10. The front retainer is installed by driving suitable fastening means through the bores 20 of the back side 14 of the front retainer 10 and then through the through holes 61 into a wall section.

The illustration of the spacer 55 on the left side of FIGS. 6a, 6b furthermore shows that the backside of the spacer 55 abutting the wall section 57 (cf. FIGS. 4a and 5a) is partially closed on the outside, i.e. except for a central opening 62. If the center bore 29 on the backside 14 (cf. FIGS. 1a–1c) is also used for installing the front retainer 10, then the respective fastening means extends essentially axially inside the spacer 55 through the opening 62 into the wall section 57. As already mentioned above, in this case, the retainer 10 including the spacer 55 cannot be removed when the rifle is in place and, for example, secured with a padlock, since access to the fastening means in the center bore 29 is prevented.

In another modifications of a spacer—not shown here—, the opening 62 described above has the form of a channel extending over the entire length of an essentially solid spacer and adapted to receive the fastening means inserted through the center bore 29.

The length of the spacer 55 depicted in FIGS. 6a and 6b is matched to the respective rifle type. Possible, however, are also spacers which consist of several nested segments or which can be adjusted within certain limitations.

According to another aspect of the invention, different rifle types can be secured by one and the same rifle holder. For this purpose, the rifle holder is provided with a rear retainer 70 as shown, for example, in the preferred embodiment of FIG. 7. Similar to FIGS. 2a–2c, the rear retainer 70 has a cup-like recess 72 for receiving the end section of a shoulder support or a rifle butt. In this case, however, the inside of the cup-like recess 72 is provided with several recesses 73 to 77 so that different shoulder supports and different rifle butts can be supported by the same rear retainer 70, as is shown in greater detail with reference to FIGS. 8a–8d. Here the recess 76 forms the lowest part of the cup-like recess 72. The next higher levels are formed by recess 75, followed by respective pair-wise recesses 74 and 73 which are essentially formed as step-like notches on opposing sides of the inner wall of the cup-shape retainer 70. In addition, according to FIG. 7, the retainer 70 includes several bores 79 extending through a side wall and a rear wall so that the retainer 70 can be optionally screwed to a mounting wall at one of these sides. Protruding from the front side of a side wall of the cup-shaped retainer 70 is furthermore a protrusion 78 for defining the position of a folded shoulder support.

Figure 7:
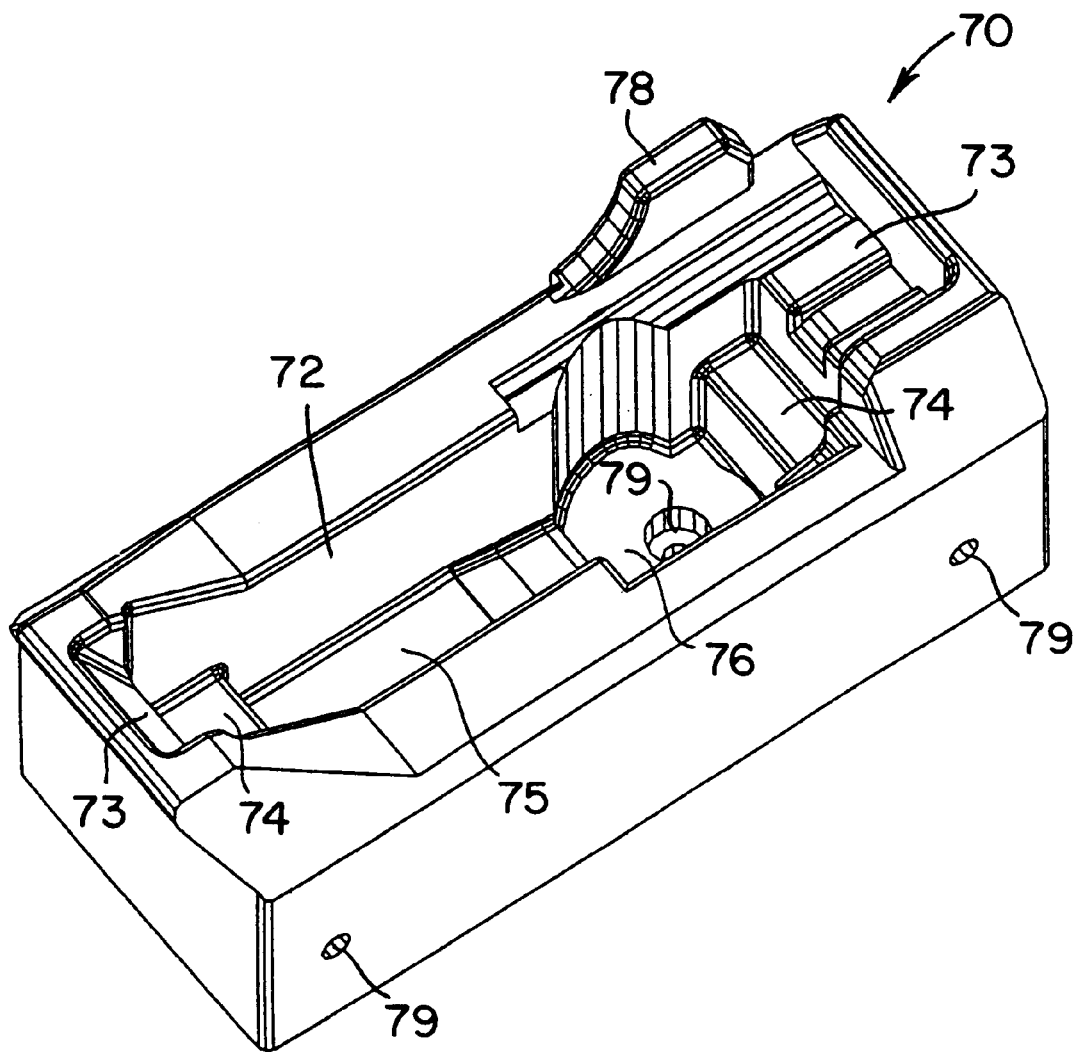
FIG. 7 a perspective view of a third embodiment for a rear retainer.

FIGS. 8a–8d depict the various mounting positions for placing different rifle types in the rear retainer 70 according to FIG. 7. Shown in the retainer 70 are only the rear rifle sections for the different rifles. Identical features have the same reference numbers as those of FIG. 7.

A rifle of type A is mounted in the rear retainer 70 according to FIG. 8a. The gun-stock of the rifle stands on the recesses 74 of the cup-shaped recess 72 of the retainer 70 (shown here in cross-section). The corner sections of the rear end of the gun-stock are thereby surrounded in a form-fitting manner. In all other aspects, the rear end of the rifle gun-stock is essentially unrestrained. According to FIGS. 8a–8d, the rifle A is nevertheless secured safely and firmly in the rear retainer 70, with the front gun-stock enveloped by a front retainer (not shown here) which is, for example, mounted to a vertical wall section via a suitable spacer (also not shown).

Referring now to FIG. 8b, there is also placed a rifle of type A in the retainer 70, however with collapsed shoulder support. Here, the rear rifle end with collapsed shoulder support is supported by the matched recesses 73 as well as by the protrusion 78 of the retainer 70 (obscured in FIG. 8b). Also depicted in FIG. 8b is a front retainer which envelops the front gun-stock of the rifle A and is supported on the vertical mounting wall via a spacer.

As shown in FIG. 8c, there is a rifle of type B mounted in the rear retainer 70 of the holder of the invention. The gun-stock which is narrower in comparison to the one of rifle A, is inserted in the recess 75 of the retainer 70 and enveloped at least at its corner sections in a form-fittingly manner.

Referring now to FIG. 8d, there is also mounted the rifle of type B, this time, however, with an insertable shoulder support. The rear end of the shoulder support is received by lowest recess 76, the shape of which is at least to a considerable extent matched to the insertable shoulder support so that this rifle type, too, is safely supported in the retainer 70.

The rear retainer 70 of the holder of the invention can thus be used for at least four different mounting positions, namely for the rifle A with extendible and foldable shoulder support, as well as for the rifle B with fixed and insertable shoulder support.

Figure 9A:
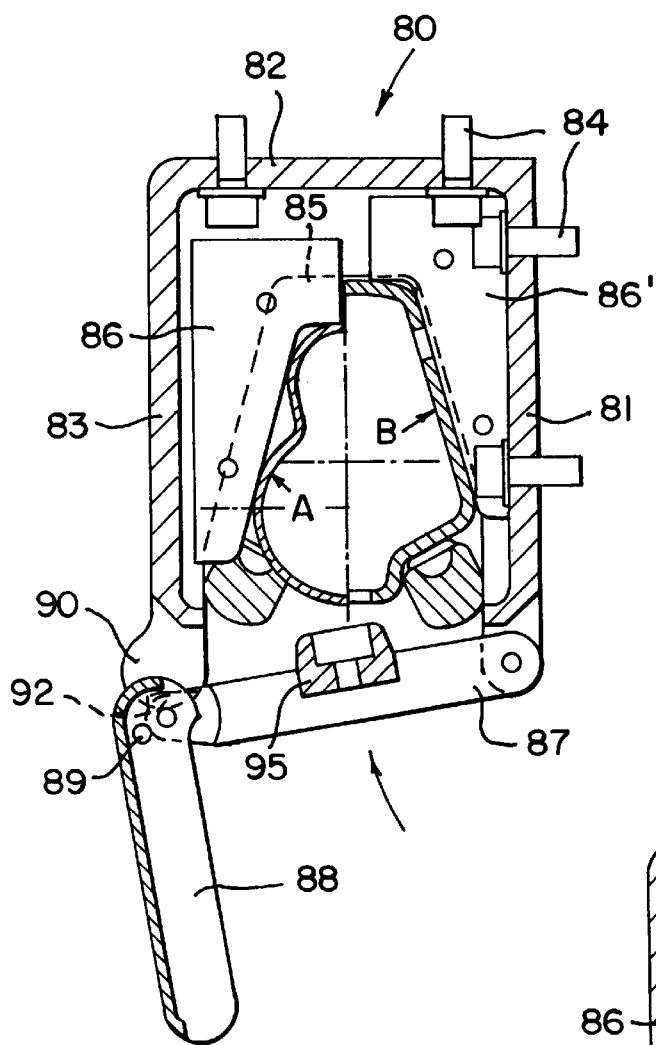
FIGS. 9a and 9b are two sectional views of another embodiment for a front retaining element.
Figure 9B:
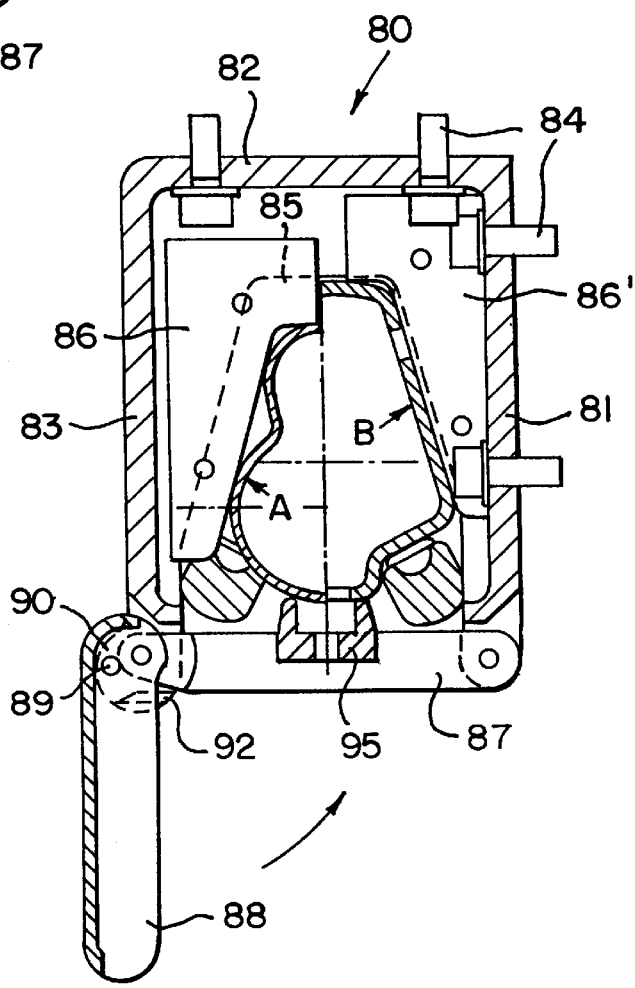

In FIGS. 9a and 9b, there is depicted an additional embodiment for a front retainer 80 of the rifle holder of the invention. Similar to the retainer 10 in FIGS. 1a–1c, this retainer 80 has three side walls 81, 82 and 83 which are oriented essentially perpendicular to each other, with an inner profile 85 protruding from the inner surfaces facing each other. This profile is matched at least in certain sections to the front gun-stock of a rifle to be received. For the purpose of adapting the retainer 80 to different rifle types with different front gun-stocks, there are further provided two adjusting elements 86 and 86' which can be connected through bores 84 with the profile 85 in the manner depicted in the FIGS. 9a and 9b. The adjusting element 86 protrudes slightly from the profile and is intended to match the receiving opening of a rifle gun-stock of the rifle type A, as outlined in the Figures. The inwardly oriented side of the adjusting element 86, on the other hand, extends essentially flush with the profile 85 so that a gun-stock of a rifle of type B can rest against the profile 85 in a form-fitting manner. Each of the side walls 81 and 82 is provided with four bores 84 through which one of the sides 81 or 82 of the retainer 80 can optionally be secured to a flat wall.

On the front open side of the retainer 80, there is provided a two-part locking element designed in the form of an eccentric locking bar. The locking element has a side member 87 which is pivotally secured with its one end to the front of the side wall 81 and with its other opposite end to a locking bar 88. The thicker front end of the side wall 83 has a recess 90 matching the front free end of the locking bar 88. When the retainer 80 is locked, the side member 87 is rotated in the direction of the arrow shown in FIG. 9a until its front end is received in the recess 90 of the side wall 83. For locking the retainer 80, the locking bar 88 is then flipped in the direction of the arrow shown in FIG. 9b until the locking bar 88 rests on the side member 87. In this position, the eccentric locking bar 88 is interlocked with the side wall 83 of the holder with the help of a pin 89 eccentrically disposed with respect to the axis of rotation of the locking bar 88 and protruding from the top side of the locking bar 88, wherein during the pivoting motion, the pin 89 is guided to the rear of a protrusion 92 in the recess 90 of the side wall 83, whereby this protrusion 92 holds the pin 89 and thereby the locking bar 88 firmly in the closed position. When the weapon is in place, opposing force applied by the inserted gun-stock to the side member 87 advantageously wedge the pin 89 on the locking bar 88 against the protrusion 92 on the side wall 83, thereby providing the interlock. This wedging action is further amplified in that on the inside of the side member 87 there is provided a protrusion 95 made of an elastic material for transmitting the force of the inserted rifle to the closed side member 87.

Figure 10A:
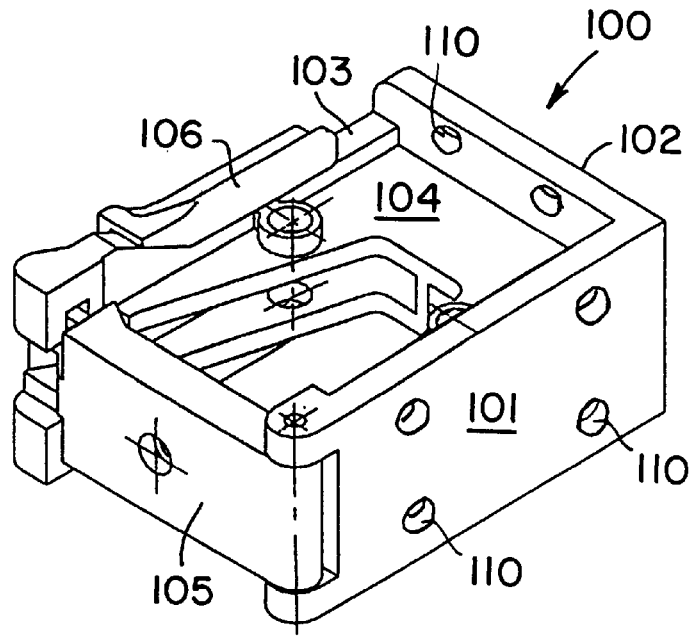
FIGS. 10a and 10b are two perspective views of a fourth embodiment of a front retainer of the rifle holder of the invention.
Figure 10B:
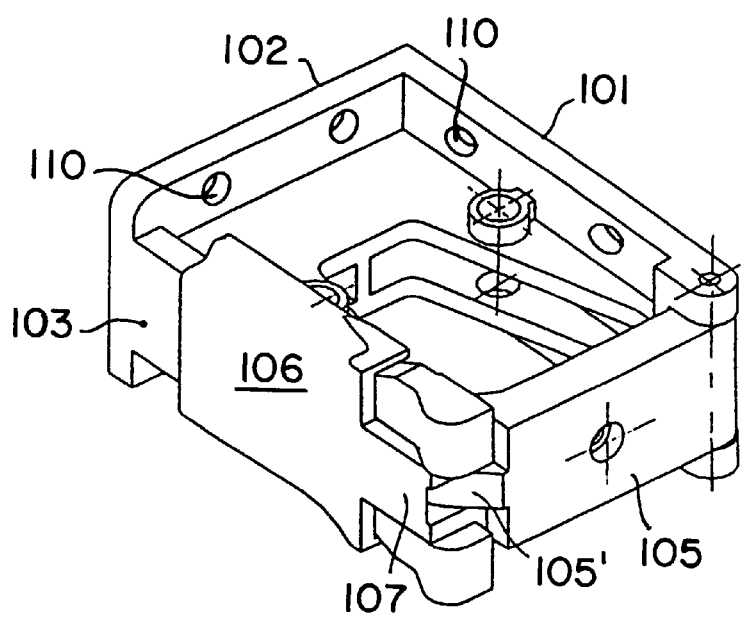

FIGS. 10a–10b finally shows another embodiment for a front retainer 100 of the rifle holder of the invention. The retainer 100 has also three essentially mutually perpendicular side walls 101, 102 and 103 with a profile 104 protruding from their inside, against which profile the front gun-stock of a mounted rifle rests. On the side walls 101 and 102, there are provided several bores 110 for enabling a flexible installation of the retainer 100.

The front retainer 100 is also provided with a locking bar 105, which is pivotally secured to the front end of the side wall 101 and which in its closed position can be interlocked through a locking mechanism with the opposite side wall 103. For this purpose, a slider 106 is slideably supported on the side wall 103. The slider 106 has a nose element 107 which envelops a clasp-shaped protrusion 105' disposed on the free end of the locking bar 105 when the slider 106 is in its forward position and the locking bar 105 is closed, so that the locking bar 105 is latched and cannot open. When the slider 106 is moved back along the side wall 103, then the protrusion 105' is released from the nose element 107, and the locking bar 105 for opening the retaining device 100 is released by rotating the locking bar 105.

Instead of this locking device with a slider, it is, of course, also possible to combine the retainer 100 with an eccentric lock similar in design to the retainer 80 of FIGS. 9a–9b.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A holder for securing a rifle, comprising
   at least one front retainer adapted for retaining a front section of the rifle and at least one rear retainer adapted to retain a rear section of the rifle;
   the at least one front retainer being constructed for partially surrounding at least one of a front gun-stock and a rifle barrel wherein the at least one front retainer comprises a locking device including a locking bar pivotally attached to a first side wall of the at least one front retainer and said locking device forming an opening for receiving at least one of said gun-stock and said rifle barrel, and a locking clasp being arranged on a second side wall of the at least one front retainer, the second side wall disposed opposite of the first side wall, the locking clasp for engaging the locking bar when the at least one front retainer is in a closed orientation; and wherein the locking clasp is connected at a rear side of the at least one front retainer and extends between two lateral sections of the second side wall of the at least one front retainer such that the locking clasp engages the locking bar by snap locking with the locking bar when the at least one front retainer is in said closed orientation.

2. The holder according to claim 1, wherein the at least one front retainer and the at least one rear retainer include at least one of a plurality of recesses and protrusions for receiving the rifle, which may vary in size.

3. The holder according to claim 2, wherein the at least one rear retainer comprises a cup-shaped inside having a plurality of recesses and protrusions, the plurality of recesses of the at least one retainer each being step-shaped and adaptable for receiving the rifle, including a shoulder support of varying shape.

4. The holder according to claim 3, wherein the at least one rear retainer includes a protrusion for receiving a folded shoulder support.

5. The holder according to claim 4, wherein the at least one rear retainer is cup-shaped.

6. The holder according to claim 4, wherein, in a locked position, a locking pin is positioned through a bore in a first lateral section of said two lateral sections, through the locking clasp and through a bore in a second lateral section of said two lateral sections section thereby immobilizing the locking clasp relative to the lateral sections such that the locking bar is locked in place.

7. The holder according to claim 6, wherein the locking bar includes an inner surface provided with a protrusion which, in the closed position, is for engaging in a respective recess on the front gun-stock of the rifle and capable of being spring-biased against the rifle.

8. The holder according to claim 2, wherein the at least one front retainer comprises an inside profile including releasably connectable adjusting elements.

9. The holder according to claim 1, wherein the at least one front retainer defines at least one bore for attachment on at least two side walls of the front retainer and the at least one rear retainer defines at least one bore for attachment on three side walls of the at least one rear retainer.

10. A kit for assembling a holder for a rifle for mounting the rifle on a mounting surface, the kit comprising:

at least one front retainer adapted to surround a front section of the rifle;

at least one rear retainer adapted to receive a rear section of the rifle; and wherein the at least one front retainer and the at least one rear retainer are adapted for being mounted on a surface and wherein the at least one front retainer and the at least one rear retainer include a plurality of recesses for receiving a rifle; wherein the at least one front retainer comprises a locking device including a locking bar pivotally attached to a first side wall of the at least one front retainer and said locking device forming an opening for receiving at least one of a gun-stock and a rifle barrel, and a locking clasp being disposed on a second side wall of the at least one front retainer, the second side wall arranged opposite of the first side wall, the locking clasp for engaging the locking bar when the at least one front retainer is in a closed orientation; wherein the locking clasp is connected at a rear side of the at least one front retainer and extends between two lateral sections of the second side wall of the at least one front retainer such that said locking clasp engages the locking bar by snap locking with the locking bar when the at least one front retainer is in said closed orientation.

11. The kit according to claim 10, wherein the at least one rear retainer is constructed such as to receive a rear section of the rifle; and wherein at least one of the front retainer and the plurality of recesses accommodate varying sizes of the rifle.

12. The kit according to claim 10, further comprising a plurality of spacers for providing space between the at least one front retainer and the mounting surface.

* * * * *